US012583427B2

(12) United States Patent
Flaum et al.

(10) Patent No.: US 12,583,427 B2
(45) Date of Patent: Mar. 24, 2026

(54) METHOD AND ELECTRONIC CONTROL UNIT FOR CONTROLLING A BRAKE SYSTEM OF A MOTOR VEHICLE

(71) Applicant: ZF CV Systems Europe BV, Brussels (BE)

(72) Inventors: Nikolai Flaum, Hannover (DE); Torsten Wallbaum, Duingen (DE)

(73) Assignee: ZF CV Systems Europe BV, Brussels (BE)

( * ) Notice: Subject to any disclaimer, the term of this patent is extended or adjusted under 35 U.S.C. 154(b) by 223 days.

(21) Appl. No.: 18/565,717

(22) PCT Filed: May 25, 2022

(86) PCT No.: PCT/EP2022/064229
§ 371 (c)(1),
(2) Date: Nov. 30, 2023

(87) PCT Pub. No.: WO2022/253674
PCT Pub. Date: Dec. 8, 2022

(65) Prior Publication Data
US 2024/0262328 A1 Aug. 8, 2024

(30) Foreign Application Priority Data
Jun. 2, 2021 (DE) ..................... 10 2021 114 305.5

(51) Int. Cl.
*B60T 13/66* (2006.01)
*B60T 17/22* (2006.01)

(52) U.S. Cl.
CPC .......... *B60T 13/662* (2013.01); *B60T 17/221* (2013.01); *B60T 2230/03* (2013.01)

(58) Field of Classification Search
CPC ........ B60T 7/12; B60T 13/662; B60T 17/221; B60T 8/17554; B60T 8/243
See application file for complete search history.

(56) References Cited

U.S. PATENT DOCUMENTS

2014/0306515 A1* 10/2014 Claussen ................. B60T 8/328
303/116.1
2015/0203117 A1* 7/2015 Kelly .................... B60W 40/06
701/91

(Continued)

FOREIGN PATENT DOCUMENTS

DE 19907633 A1 10/1999
DE 19958221 A1 6/2001
(Continued)

OTHER PUBLICATIONS

European Patent Office, Rijswijk, Netherlands, International Search Report of International Application No. PCT/EP2022/064229, Mailed Oct. 24, 2022, 2 pages.

*Primary Examiner* — John Kwon

(74) *Attorney, Agent, or Firm* — Dickinson Wright PLLC

(57) ABSTRACT

A method is provided for controlling a brake system (12) of a motor vehicle (2), having wheel brakes controllable for carrying out an anti-lock function (ABS) and for carrying out a roll stability control function (RSC). During cornering or in the event of a sudden evasive movement, the motor vehicle (2) is braked by actuation of the wheel brakes (26a, 26b, 28a, 28b) on account of a determined risk of tilting. With the start (t1) of an ABS control operation on the braking force ($p_{B\_KA}$) of a wheel brake (26b; 28b) on the inside of the bend on at least one motor vehicle axle (4; 8), the braking force ($p_{B\_KA}$) of at least one wheel brake (26a; 28a) on the outside of the bend is increased, and is lowered again with the end of the ABS control operation (t3).

20 Claims, 2 Drawing Sheets

(56) References Cited

U.S. PATENT DOCUMENTS

| | | | | |
|---|---|---|---|---|
| 2015/0217771 A1* | 8/2015 | Kelly | ............... | F16H 61/0213 |
| | | | | 701/93 |
| 2016/0039415 A1* | 2/2016 | Brockley | ........... | B60W 30/143 |
| | | | | 701/94 |
| 2016/0200323 A1* | 7/2016 | Kelly | .................... | B60W 10/11 |
| | | | | 701/51 |
| 2017/0137023 A1* | 5/2017 | Anderson | ............ | B60W 50/14 |
| 2023/0322207 A1* | 10/2023 | Plaehn | ................. | B60W 10/04 |
| | | | | 701/26 |

FOREIGN PATENT DOCUMENTS

| | | | |
|---|---|---|---|
| DE | 10017045 | A1 | 10/2001 |
| DE | 10046036 | A1 | 3/2002 |
| DE | 102004017634 | A1 | 10/2005 |
| DE | 102008019194 | A1 | 10/2009 |
| DE | 102015009160 | A1 | 1/2017 |
| DE | 102015013761 | A1 | 4/2017 |
| WO | 2003008242 | A1 | 1/2003 |
| WO | 2014012609 | A1 | 1/2014 |

* cited by examiner

METHOD AND ELECTRONIC CONTROL UNIT FOR CONTROLLING A BRAKE SYSTEM OF A MOTOR VEHICLE

FIELD

The present disclosure relates to a method for controlling a brake system of a motor vehicle, which system has wheel brakes, which can be controlled by an electronic control unit in respect of their actuation, and control devices for carrying out an anti-lock function and for carrying out a roll stability control function, wherein, during cornering or in the event of a sudden evasive movement, the motor vehicle is braked by actuation of the wheel brakes on account of a determined risk of tilting about the longitudinal axis of the motor vehicle. The present disclosure also relates to an electronic control unit for carrying out this method.

BACKGROUND

In the case of commercial vehicles, such as trucks, vans, and buses, there is a risk of tipping over sideways during cornering or in the event of a sudden evasive movement intended, for example, to evade an obstacle, particularly in the loaded state, on account of the high center of gravity of the motor vehicle. In order to avoid such accidents, a number of control devices and control methods have already been developed or at least proposed, and some of these are already being used in commercial vehicles.

DE 199 07 633 A1, for example, discloses a method and a device for stabilizing a motor vehicle, in particular for preventing a motor vehicle from tipping over about the longitudinal axis of the motor vehicle. The method envisages that a variable describing the transverse dynamics of the motor vehicle is detected and compared with a threshold value. If said variable has reached or exceeded the threshold value, the motor vehicle is braked by braking interventions, engine interventions and/or retarder interventions or is held at a predetermined driving speed. Accordingly, such interventions generate a braking effect by said units.

DE 199 58 221 A1 discloses a method for preventing a motor vehicle from tipping over, in which the transverse acceleration of the motor vehicle is measured by pressure sensors on the air springs of the motor vehicle axles and a transverse acceleration sensor or wheel speed sensors. From the values of the determined transverse acceleration and the loading state of the motor vehicle, a limit acceleration is determined at which the bellows pressure of the air spring on the inside of a bend on one motor vehicle axle has fallen to the ambient pressure. If the current transverse acceleration reaches 75% of the limit acceleration, a warning signal is output to the driver and/or the driving speed of the motor vehicle is automatically reduced by throttling the engine or actuating the wheel brakes.

DE 10 2004 017 634 A1 discloses a device and a method for roll stabilization of a motor vehicle, with or in which a combined signal consisting of the yaw rate and the roll rate of the motor vehicle is detected by a yaw rate sensor device. By splitting the signal by a Kalman filter, the current roll angle of the motor vehicle is determined. If the roll angle exceeds a predetermined threshold value, a warning signal is output to the driver and/or the motor vehicle is automatically braked by an action on the brake system.

In addition, DE 10 2008 019 194 A1 discloses a method and a device for stability control of a motor vehicle, which are used to carry out a roll stabilization control method and a yaw control method. In the roll stabilization control method, a transverse acceleration signal, a steering angle signal, a driving speed signal, and a motor vehicle mass signal are detected. A tilt limit of the motor vehicle is determined from the motor vehicle mass signal. A value for the tilting dynamics is determined from the steering angle signal and the driving speed signal. Depending on the tilt limit in relation to the tilt dynamics and the transverse acceleration signal, a roll stabilization controller is activated, by which, if necessary, the motor vehicle is braked by actuating the brake system and/or by throttling the engine.

Because the wheel loads shift dynamically from the radially inside to the radially outside during cornering or in the event of a sudden evasive movement, i.e. the wheels on the inside of the bend are relieved and the wheels on the outside of the bend are subjected to greater loads, there is a risk that the wheels on the inside of the bend will reach or exceed their slip limit if the wheel brakes are actuated simultaneously. As soon as this danger is electronically detected, an anti-lock function is activated, by which the brake pressure in the wheel brakes on the inside of the bend is made to fluctuate cyclically between an upper or highest control pressure and a lower or lowest control pressure by an ABS control operation (anti-lock control) and is thus lowered in terms of the average over time. As a result, however, the braking force of the wheel brakes on the inside of the bend is reduced and the motor vehicle in question is braked less powerfully than is provided for by the aforementioned roll stability control function per se. In extreme cases, it is therefore no longer possible to prevent the motor vehicle from tipping over sideways.

SUMMARY

The object underlying the present disclosure is therefore that of presenting a method for controlling a brake system of a motor vehicle of the type mentioned at the outset, by which, with the anti-lock function activated, the motor vehicle is nevertheless braked sufficiently during cornering or in the event of a sudden evasive movement to prevent the motor vehicle from tipping over sideways. In addition, the intention is to present an electronic control unit with which the aforementioned method can be carried out.

The object in respect of the method is achieved by a method having the features disclosed herein and in various ones of the appended claims. The same applies to the method which can be carried out specifically on a brake system of a motor vehicle, which system can be operated by a hydraulic or pneumatic pressure medium. Advantageous developments of the method are defined in the disclosure and throughout the claims. The features of the electronic control unit are also specified herein.

The method according to the present disclosure can be carried out on all motor vehicle brake systems that have devices which can be controlled in respect of a brake actuation. Thus, the method can be carried out, for example, on motor vehicle brake systems with hydraulic or pneumatic brake actuators, but also on motor vehicle brake systems with electromagnetic brakes or wheel hub motors known per se.

Accordingly, the present disclosure relates in the first instance to a method for controlling a brake system of a motor vehicle, which system has wheel brakes, which can be controlled by an electronic control unit in respect of their actuation, and control devices for carrying out an anti-lock function (ABS) and for carrying out a roll stability control function (RSC=Rollover Stability Control), wherein, during cornering or in the event of a sudden evasive movement, the motor vehicle is braked by actuation of the wheel brakes on account of a determined risk of tilting about the longitudinal axis of the motor vehicle.

In order to achieve the object in respect of the method, it is envisaged that, with the start of an ABS control operation on the braking force of a wheel brake on the inside of the bend on at least one motor vehicle axle, the braking force of at least one wheel brake on the outside of the bend is increased, and in that the braking force of the at least one wheel brake on the outside of the bend is lowered again with the end of the ABS control operation.

If, therefore, during the braking process, the wheel on the inside of the bend on at least one motor vehicle axle reaches its slip limit and, as a consequence, the ABS control of the braking force of the wheel brake on the inside of the bend begins, the braking force of at least one wheel brake on the outside of the bend on at least the same motor vehicle axle is increased, and thus the loss of braking force due to the ABS control of the braking force of the wheel brake on the inside of the bend is at least partially compensated. The motor vehicle is thereby braked to a large extent in accordance with the specification of the roll stability control function, and the motor vehicle is prevented from tipping over sideways.

In order to reliably prevent the motor vehicle from tipping over sideways, the increase in the braking force of the at least one wheel brake on the outside of the bend should be dimensioned in such a way that the loss of braking force of the wheel brake on the inside of the bend due to the ABS control operation is thereby largely compensated.

For this purpose, provision is preferably made for the mean braking force of the wheel brake on the inside of the bend to be determined during the ABS control operation, and for the value of the increase in the braking force of the wheel brake on the outside of the bend to correspond to the force difference between the standard braking force provided from the start of the execution of the roll stability control function and the mean braking force of the wheel brake on the inside of the bend.

Furthermore, provision can be made, during the ABS control operation, for the braking force at the wheel brake on the inside of the bend to be determined as an upper braking force and a lower braking force, and for the mean braking force at the wheel brake on the inside of the bend to be determined as the arithmetic mean value of the upper braking force and the lower braking force during the ABS control operation.

As mentioned, the method having the features of the present disclosure can also be carried out on a motor vehicle brake system whose brake actuators can be actuated pneumatically or hydraulically. In the pneumatically or hydraulically actuatable brake systems, the braking force to be controlled according to the method described here is technically equivalent to controlling the pressure of the pressure medium in the lines leading directly to the brake actuators. Accordingly, a method for achieving the object stated at the outset is also provided, which method can be carried out specifically on a pneumatic or hydraulic brake system.

Thus, the present disclosure also relates to a method for controlling a brake system of a motor vehicle, which can be controlled by an electronic control unit, and has wheel brakes which can be actuated by a pressure medium, and control devices for carrying out an anti-lock function and for carrying out a roll stability control function, wherein, during cornering or in the event of a sudden evasive movement, the motor vehicle is braked by introducing a brake pressure into the wheel brakes on account of a determined risk of tilting about the longitudinal axis of the motor vehicle.

In order to achieve the object in respect of the method, it is envisaged here that, with the start of an ABS control operation on the brake pressure $p_{B\_KI}$ of the wheel brake on the inside of the bend on at least one motor vehicle axle, the brake pressure $p_{B\_KA}$ of a wheel brake on the outside of the bend is increased, and that the brake pressure $p_{B\_KA}$ of the at least one wheel brake on the outside of the bend is lowered again with the end of the ABS control operation.

If, therefore, during the braking process, the wheel on the inside of the bend on at least one motor vehicle axle reaches its slip limit and, as a consequence, the ABS control of the brake pressure $p_{B\_KI}$ of the wheel brake on the inside of the bend begins, the brake pressure $p_{B\_KA}$ of the wheel brake on the outside of the bend on the same or on some other motor vehicle axle is increased, and thus the loss of braking force due to the ABS control of the brake pressure $p_{B\_KI}$ of the wheel brake on the inside of the bend is at least partially compensated. The motor vehicle is thereby braked to a large extent in accordance with the specification of the roll stability control function, and the motor vehicle is prevented from tipping over sideways.

In order to reliably prevent the motor vehicle from tipping over sideways, the increase in the brake pressure $\Delta p_{B\_KA}$ of the wheel brake on the outside of the bend should, according to a development of this method, be dimensioned in such a way that the loss of braking force of the wheel brake on the inside of the bend due to the ABS control operation is thereby largely compensated.

For this purpose, provision is preferably made for the mean brake pressure $p_{B\_R-m}$ of the wheel brake on the inside of the bend to be determined during the ABS control operation, and for the value of the increase in the brake pressure $\Delta p_{B\_KA}$ of the wheel brake on the outside of the bend to correspond to the pressure difference $\Delta p_{B\_KI}$ between the standard brake pressure $p_{B\_KS\_Std}$ provided from the start of the execution of the roll stability control function and the mean brake pressure $p_{B\_R-m}$ of the wheel brake on the inside of the bend ($\Delta p_{B\_KA} = \Delta p_{B\_KI} = p_{B\_KS\_Std} - p_{B\_R-m}$).

Provision can furthermore be made, during the ABS control operation on the brake pressure $p_{B\_KI}$ at the wheel brake on the inside of the bend, for an upper brake pressure $p_{B\_R-o}$ and a lower brake pressure $p_{B\_R-u}$ to be determined, and for the mean brake pressure $p_{B\_R-m}$ at the wheel brake on the inside of the bend to be determined as an arithmetic mean value of the upper measured brake pressure $p_{B\_R-o}$ and the lower measured brake pressure $p_{B\_R-u}$ during the ABS control operation ($p_{B\_R-m} = (p_{B\_R-o} + p_{B\_R-u})/2$).

In the case of a compressed air brake system, which is common in trucks and buses, with axle-wise assignment of one relay valve in each case, said increase in the brake pressure $p_{B\_KA}$ of the wheel brake on the outside of the bend is accomplished by setting a correspondingly increased brake pressure $p_{B\_KA\_max}$ in an assigned relay valve of the relevant motor vehicle axle. Although this theoretically also increases the brake pressure $p_{B\_KI}$ of the wheel brake on the inside of the bend, this has no practical effect owing to the active ABS control of this brake pressure. Additionally or alternatively, a relay valve on another motor vehicle axle can also be actuated in the manner described if a wheel brake on the inside of the bend is currently being actuated by an active ABS control system.

A final development of the method envisages that, at the end of the ABS control operation resulting from the reduced driving speed due to falling below the slip limit of the wheel on the inside of the bend, the brake pressure $p_{B\_KA}$ set in the relay valve of the motor vehicle axle is lowered again to the standard brake pressure $p_{B\_KS\_Std}$ provided by the roll stability control function.

Finally, as already mentioned, the present disclosure relates to an electronic control unit for a motor vehicle, which control unit is designed to carry out the method steps described herein and in various ones of the claims. This will be discussed in detail below.

BRIEF DESCRIPTION OF THE DRAWINGS

The method according to the present disclosure is explained in greater detail below by way of an exemplary embodiment illustrated in the appended drawings. In the drawings.

DETAILED DESCRIPTION

Figure 2:
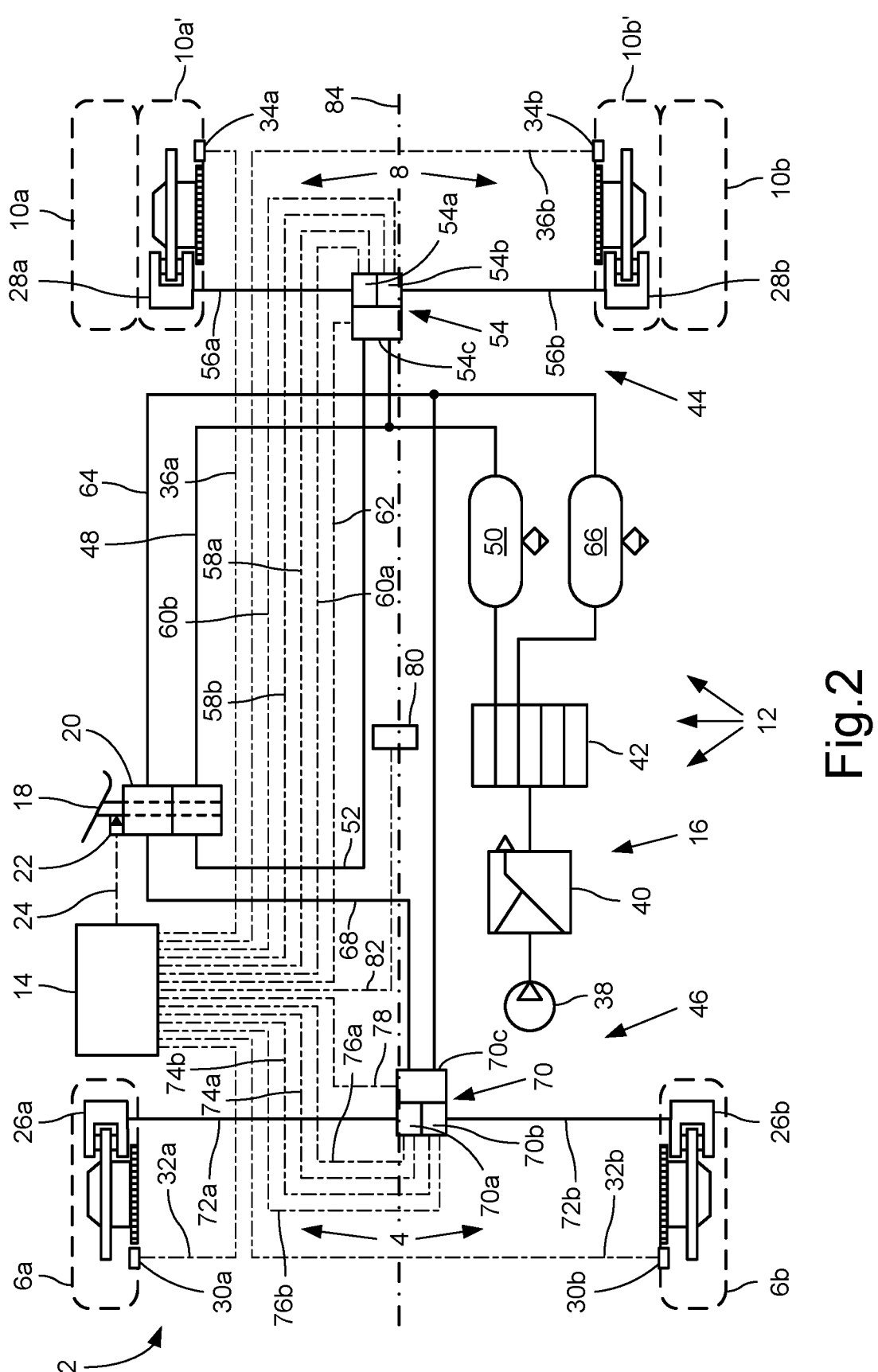
FIG. 2 shows a pneumatic brake system of a motor vehicle in a schematic view to illustrate the method according to the present disclosure.

The motor vehicle 2 depicted in FIG. 2, which is shown to be a commercial vehicle, has a single-tire front axle 4 with two wheels 6a, 6b and a double-tire rear axle 8 with a total of four wheels 10a, 10a', 10b, 10b'.

A brake system 12 of the motor vehicle 2 is designed as an electronically controllable compressed air brake system. In addition to an electronic control unit 14, the brake system 12 includes a compressed air supply device 16, a foot brake valve 20 that can be actuated via a brake pedal 18 and has a brake value transmitter 22 embodied as a travel sensor, as well as pressure-medium-actuatable wheel brakes 26a, 26b, 28a, 28b designed as friction brakes. The brake value transmitter 22 of the foot brake valve 20 is connected to the control unit 14 via an electrical sensor line 24. A wheel speed sensor 30a, 30b, 34a, 34b is arranged at each of the wheels 6a, 6b of the front axle 4 and the wheel pairs 10a, 10a'; 10b, 10b' of the rear axle 8, and each wheel speed sensor is connected to the control unit 14 via an electrical sensor line 32a, 32b, 36a, 36b.

The compressed air supply device 16 has a compressor 38, a pressure regulator 40, and a multi-circuit protection valve 42. Compressed air is delivered by the compressor 38, which can be driven by a drive motor (not shown), via the pressure regulator 40 and the multi-circuit protection valve 42, into two brake circuits 44, 46 of the brake system 12.

The first brake circuit 44 has a first pressure accumulator 50 and a first supply line 48, which is routed from the multi-circuit protection valve 42 to the foot brake valve 20 and to a first axle valve module 54 on the rear axle 8. A first axle brake line 52, into which a brake pressure is introduced as a function of the actuation of the brake pedal 18, extends from the foot brake valve 20 to the first axle valve module 54. The first axle valve module 54 includes a first relay valve 54c and in each case one ABS valve assembly 54a, 54b per wheel pair 10a, 10a'; 10b, 10b' of the rear axle 8. From each of the two ABS valve assemblies 54a, 54b of the first axle valve module 54, a wheel brake line 56a, 56b is routed to the associated wheel brake 28a, 28b of the rear axle 8. The two rear ABS valve assemblies 54a, 54b each comprise an ABS inlet valve and an ABS outlet valve, as well as a pressure sensor (not illustrated). The ABS inlet valves and the ABS outlet valves are each connected to the control unit 14 via an electrical control line 58a, 58b. The pressure sensors are connected pneumatically to the respective wheel brake line 56a, 56b and are each connected to the control unit 14 via an electrical sensor line 60a, 60b.

The relay valve 54c of the first axle valve module 54 is electronically controlled primarily in accordance with the brake value detected by the brake value transmitter 22 of the foot brake valve 20. For this purpose, the first relay valve 54c is connected via an electrical control line 62 to the electronic control unit 14. In the event of redundancy, i.e. in the event of a failed electronic control system, the relay valve 54c of the first axle valve module 54 is controlled pneumatically in accordance with the brake pressure prevailing in the first axle brake line 52.

The second brake circuit 46 has a second pressure accumulator 66 and a second supply line 64, which is routed from the multi-circuit protection valve 42 to the foot brake valve 20 and to a second axle valve module 70 on the rear axle 4. A second axle brake line 68, into which a brake pressure is introduced as a function of the actuation of the brake pedal 18, extends from the foot brake valve 20 to the second axle valve module 70. The second axle valve module 70 includes a second relay valve 70c and in each case one ABS valve assembly 70a, 70b per wheel 6a, 6b of the rear axle 4. From each of the two front ABS valve assemblies 70a, 70b of the second axle valve module 70, a wheel brake line 72a, 72b is routed to the associated wheel brake 26a, 26b of the front axle 4. The two front ABS valve assemblies 70a, 70b each comprise an ABS inlet valve and an ABS outlet valve, as well as a pressure sensor (not illustrated). The two front ABS inlet valves and ABS outlet valves are each connected to the control unit 14 via an electrical control line 74a, 74b. The pressure sensors are connected to the respective front wheel brake line 72a, 72b and are each connected to the control unit 14 via an electrical sensor line 76a, 76b.

The relay valve 70c of the second axle valve module 70 is likewise electronically controlled primarily in accordance with the braking value detected by the braking value transmitter 22 of the foot brake valve 20, and for this purpose is connected via an electrical control line 78 to the electronic control unit 14. In the event of redundancy, the relay valve 70c of the second axle valve module 70 is controlled pneumatically in accordance with the brake pressure prevailing in the second axle brake line 68.

In an anti-lock function, which is stored as a control program in a program memory of the control unit 14, the travel signal of the brake value transmitter 22, the rotational speed signals of the wheel speed sensors 30a, 30b, 34a, 34b and the pressure signals of the pressure sensors of the ABS valve devices 54a, 54b, 70a, 70b and other information, such as the current driving speed, the current steering angle and the current loading state, are evaluated during a braking process. When an approach of a wheel 6a, 6b or a wheel pair 10a, 10a'; 10b, 10b' to its slip limit is detected, the brake pressure in the associated wheel brake 26a, 26b, 28a, 28b is regulated in a kind of intermittent braking process by control of the ABS inlet valve and the ABS outlet valve of the respective ABS valve assembly 54a, 54b, 70a, 70b. This prevents wheel slip on the roadway.

In a roll stability control function, which is likewise stored as a control program in the program memory of the control unit 14, the sensor signal of a tilt sensor 80 and other information, such as the current driving speed, the current steering angle, and the current loading state, are evaluated during cornering. If an approach to a tilt limit is detected, the exceeding of which could lead to the motor vehicle 2 tipping over about the longitudinal axis 84 of the motor vehicle, the motor vehicle 2 is braked by introducing a brake pressure into the wheel brakes 26a, 26b, 28a, 28b by control of the two relay valves 54c, 70c. The tilt sensor 80, which is connected to the control unit 14 via a sensor line 82, can be a transverse acceleration sensor or a roll angle sensor.

In the following, the brake pressure curves in the diagram of FIG. 1 will be used to explain how the motor vehicle 2 is braked during cornering according to the method according to the present disclosure in the roll stability control function when an ABS control operation is performed on the brake pressure by the anti-lock function on account of the dynamic shift in the wheel loads at the wheel brake on the inside of the bend on a motor vehicle axle.

Figure 1:
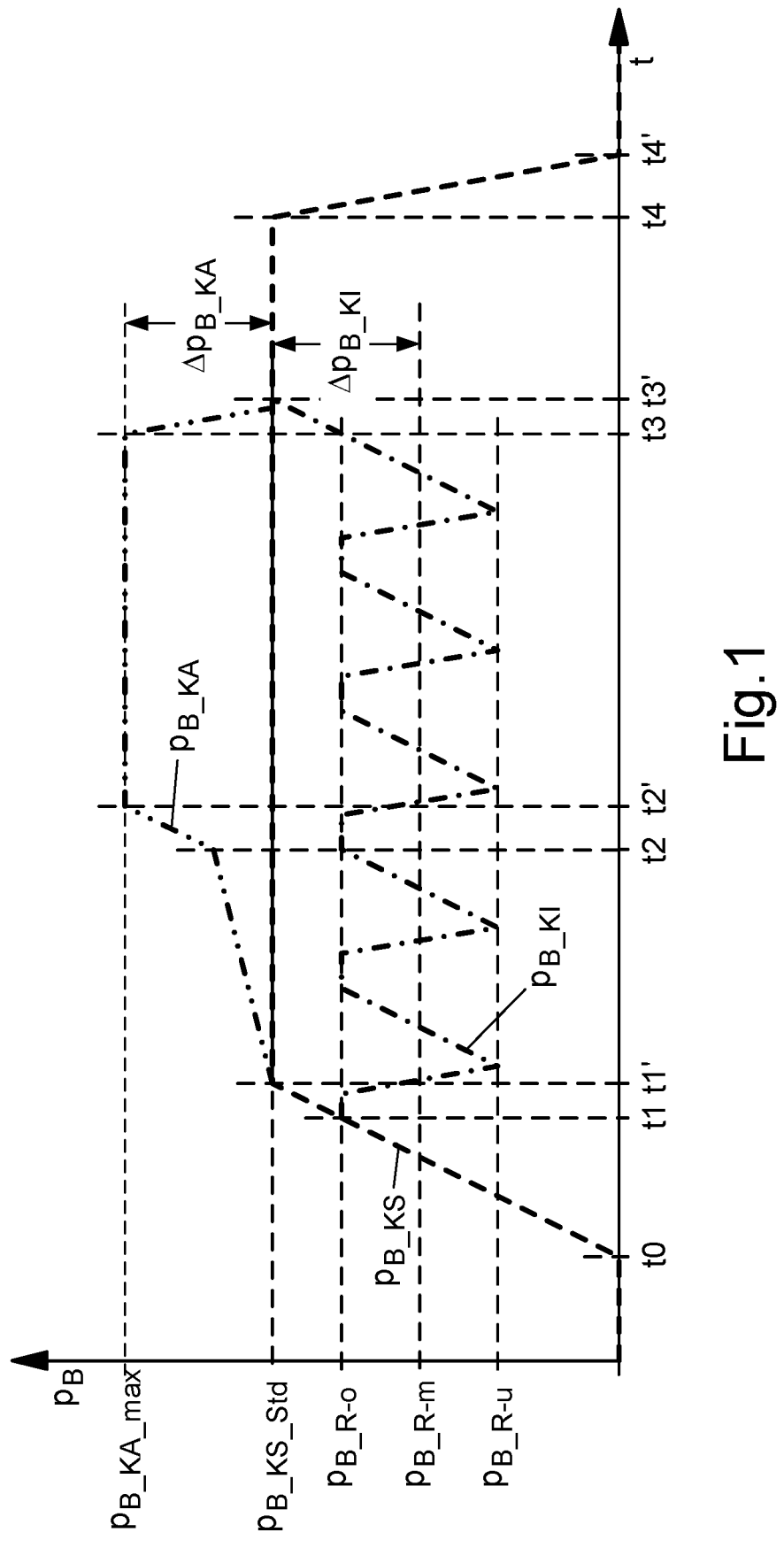
FIG. 1 shows a braking process with an application of the control method according to the present disclosure in a brake pressure-time diagram.

In the diagram of FIG. 1, the theoretical curve of the pneumatic brake pressure $p_{B\_KS}$ of both wheel brakes on a motor vehicle axle in the absence of ABS control is shown in dashed lines. The partially deviating curve of the pneumatic brake pressure $p_{B\_KI}$ of the wheel brake on the inside of the bend is represented by a dash-dot line, and the likewise partially deviating curve of the pneumatic brake pressure $p_{B\_KA}$ of the wheel brake on the outside of the bend is represented by a double-dot-dash line.

Assuming a left-hand bend currently being traversed and considering the brake pressures in the wheel brakes 26a, 26b at the front axle of the motor vehicle 2, an approach to the tilt limit of the vehicle 2 is observed when the roll stability control function is applied at time to. This leads to the introduction of a brake pressure $p_{B\_KS}$ into the wheel brakes 26a, 26b on the front axle 4 via the second relay valve 70c. In order for the motor vehicle 2 to be braked sufficiently to prevent it from tipping over sideways, the brake pressure $p_{B\_KS}$ should be set to a standard brake pressure $p_{B\_KS\_Std}$ provided and then initially remain constant.

However, before the standard brake pressure $p_{B\_KS\_Std}$ is reached, the anti-lock function detects an approach to or exceeding of the wheel slip limit at the front wheel 6b on the inside of the bend at time t1, leading to the start of ABS control of the brake pressure $p_{B\_KI}$ of the wheel brake 26b on the inside of the bend between the upper control pressure $p_{B\_R-o}$ and the lower control pressure $p_{B\_R-u}$. At time t1', the brake pressure $p_{B\_KA}$ of the wheel brake 26a on the outside of the bend reaches the standard brake pressure $p_{B\_KS\_Std}$ provided per se and is then increased further, initially with a relatively low pressure gradient, by corresponding control of the second relay valve 70c. At time t2, the mean brake pressure $p_{B\_R-m}$ of the ABS control operation and its pressure difference $\Delta p_{B\_KI}$ from the standard brake pressure $p_{B\_KS\_Std}$ provided per se have been determined from the first control cycles of the ABS control of the brake pressure $p_{B\_KI}$ of the wheel brake 26b on the inside of the bend. The mean brake pressure $p_{B\_R-m}$ is preferably determined as the arithmetic mean of the upper brake pressure $p_{B\_R-o}$ and the lower brake pressure $p_{B\_R-u}$ during the ABS control operation $(p_{B\_R-m}=(p_{B\_R-o}+p_{B\_R-u})/2)$.

In order to compensate for the loss of braking force of the wheel brake 26b on the inside of the bend caused by the current ABS control operation in comparison with the wheel brake 26a on the outside of the bend, it is provided that the brake pressure $p_{B\_KA}$ of the wheel brake 26a on the outside of the bend is increased to a maximum brake pressure $p_{B\_KA\_max}$, which is above the standard brake pressure $p_{B\_KS\_Std}$ provided per se by the same pressure difference $\Delta p_{B\_KA}=\Delta p_{B\_KI}$ ($p_{B\_KA\_max}=p_{B\_KS\_Std}+\Delta p_{B\_KA}$). Therefore, the brake pressure $p_{B\_KA}$ of the wheel brake 26a on the outside of the bend is increased further with a high pressure gradient from time t2 and reaches the intended target pressure $p_{B\_KA\_max}$ at time t2'.

Owing to the driving speed at time t3, which has been reduced in the meantime, the certain undershooting of the slip limit of the wheel 6b on the inside of the bend is detected by the anti-lock function, and therefore the ABS control of the brake pressure $p_{B\_KI}$ of the wheel brake 26b on the inside of the bend is then terminated. At the same time, the roll stability control function lowers the brake pressure $p_{B\_KA\_max}$ introduced via the second relay valve 70c to the standard brake pressure $p_{B\_KS\_Std}$ provided in the absence of ABS control, which is reached approximately at time t3' in both wheel brakes 26a, 26b on the front axle 4. After this, there is no longer any danger of tipping over at time t4 thanks to the further fall in the driving speed of the motor vehicle 2, and therefore the brake pressure $p_{B\_KS}$ is then reduced to the value zero via the second relay valve 70c by time t4', and thus the braking process for preventing the vehicle from tipping over sideways is terminated.

If a motor vehicle 2 is braked by a roll stability control function during cornering, and, at the same time, during ABS control of the brake pressure $p_{B\_KI}$ of a wheel brake 26b on the inside of the bend on at least one motor vehicle axle 4, the brake pressure $p_{B\_KA}$ of the wheel brake 26a on the outside of the bend on the same or a different motor vehicle axle 4 is increased by a pressure difference $\Delta p_{B\_KA}$, which largely corresponds to the pressure loss $\Delta p_{B\_KI}$ of the wheel brake 26b on the inside of the bend due to the ABS control operation, the braking of the motor vehicle 2 takes place with approximately the same braking force as in the absence of active ABS control, thus making it possible to reliably prevent the motor vehicle 2 from tipping over sideways.

It will be appreciated that the above description describes an embodiment of the novel aspects of the present disclosure, and that various modifications to the illustrated embodiment are similarly envisaged, including different combinations of various features described above.

LIST OF REFERENCE SIGNS (PART OF THE DESCRIPTION)

2 motor vehicle, commercial vehicle
4 motor vehicle axle, front axle
6a, 6b wheels on the front axle
8 motor vehicle axle, rear axle
10a, 10a' wheels on the rear axle
10b, 10b' wheels on the rear axle
12 brake system, compressed air brake system
14 electronic control unit
16 compressed air supply device
18 brake pedal
20 foot brake valve
22 brake value transmitter, travel sensor
24 sensor line
26a, 26b wheel brakes, friction brakes on the front axle
28a, 28b wheel brakes, friction brakes on the rear axle
30a, 30b wheel speed sensors on the front axle
32a, 32b sensor lines
34a, 34b wheel speed sensors on the rear axle
36a, 36b sensor lines
38 compressor
40 pressure regulator
42 multi-circuit protection valve
44 first brake circuit
46 second brake circuit
48 first supply line
50 first pressure accumulator
52 first axle brake line 54 first axle valve module 54a, 54b ABS valve assemblies 54c first relay valve 56a, 56b wheel brake lines on the rear axle 58a, 58b control lines 60a, 60b sensor lines 62 control line 64 second supply line 66 second pressure accumulator 68 second axle brake line 70 second axle valve module 70a, 70b ABS valve assemblies 70c second relay valve 72a, 72b wheel brake lines on the front axle 74a, 74b control lines 76a, 76b sensor lines 78 control line 80 tilt sensor, transverse acceleration sensor, roll angle sensor 82 sensor line 84 motor vehicle longitudinal axis ABS anti-lock brake system $p_B$ brake pressure; braking force $p_{B\_KA}$ brake pressure (braking force) at the wheel brake on the outside of the bend $p_{B\_KA\_max}$ maximum brake pressure (braking force) at the wheel brake on the outside of the bend $p_{B\_KI}$ brake pressure (braking force) at the wheel brake on the inside of the bend $p_{B\_KS}$ brake pressure (braking force) of the roll stability control function $p_{B\_KS\_Std}$ standard brake pressure (standard braking force) of the roll stability control function $p_{B\_R-m}$ mean brake pressure (braking force) of the ABS control operation $p_{B\_R-o}$ upper brake pressure (braking force) of the ABS control operation $p_{B\_R-u}$ lower brake pressure (braking force) of the ABS control operation RSC Roll Stability Control t time t0 time t1, t1' times t2, t2' times t3, t3' times t4, t4' times

The invention claimed is:

1. A method for controlling a brake system (12) of a motor vehicle (2), which system has wheel brakes (26a, 26b, 28a, 28b), which can be controlled by an electronic control unit (14) in respect of their actuation, and control devices for carrying out an anti-lock function (ABS) and for carrying out a roll stability control function (RSC), the method comprising:

determining, by the electronic control unit (14) during cornering or in the event of a sudden evasive movement defining a bend, a determined risk of tilting of the motor vehicle (2) about a longitudinal axis (84) thereof;

executing a roll stability control function by the electronic control unit and braking the vehicle by actuation of the wheel brakes (26a, 26b, 28a, 28b) on account of the determined risk of tilting;

starting (t1) an ABS control operation on a braking force ($p_{B\_KA}$) of a wheel brake (26b; 28b) on an inside of the bend on at least one motor vehicle axle (4; 8), with the starting of the ABS control operation, increasing a braking force ($p_{B\_KA}$) of at least one wheel brake (26a; 28a) on an outside of the bend, and lowering the braking force ($p_{B\_KA}$) of the at least one wheel brake (26a; 28a) on the outside of the bend with the end of the ABS control operation (t3).

2. The method as claimed in claim 1, wherein the increase in the braking force ($\Delta p_{B\_KA}$) of the at least one wheel brake (26a; 28a) on the outside of the bend compensates for is dimensioned in such a way that a loss of braking force of the wheel brake (26b; 28b) on the inside of the bend due to the ABS control operation is thereby compensated.

3. The method as claimed in claim 2, mean braking force ($p_{B\_R-m}$) of the wheel brake (26b; 28b) on the inside of the bend is determined during the ABS control operation, and a value of the increase in the braking force ($\Delta p_{B\_KA}$) of the wheel brake (26a; 28a) on the outside of the bend corresponds to a force difference ($\Delta p_{B\_KI}$) between a standard braking force ($p_{B\_KS\_Std}$) provided from the start of the execution of the roll stability control function and the mean braking force ($p_{B\_R-m}$) of the wheel brake (26b) on the inside of the bend ($\Delta p_{B\_KA}=\Delta p_{B\_KI}=p_{B\_KS\_Std}-p_{B\_R-m}$).

4. The method as claimed in claim 3, wherein, during the ABS control operation, the braking force ($p_{B\_KI}$) at the wheel brake (26b; 28b) on the inside of the bend is determined as an upper braking force ($p_{B\_R-o}$) and a lower braking force ($p_{B\_R-u}$), and the mean braking force ($p_{B\_R-m}$) at the wheel brake (26b; 28b) on the inside of the bend is determined as the arithmetic mean value of the upper braking force ($p_{B\_R-o}$) and the lower braking force ($p_{B\_R-u}$) during the ABS control operation ($p_{B\_R-m}=(p_{B\_R-o}+p_{B\_R-u})/2$).

5. A method for controlling a brake system (12) of a motor vehicle (2), which system can be controlled by an electronic control unit (14) and which has wheel brakes (26a, 26b, 28a, 28b), which can be actuated by a pressure medium, and control devices for carrying out an anti-lock function (ABS) and for carrying out a roll stability control function (RSC), the method comprising;

executing, during cornering or in the event of a sudden evasive movement defining a bend, a roll stability control function by the electronic control unit, and braking the motor vehicle (2) by introducing a brake pressure into the wheel brakes (26a, 26b, 28a, 28b) on account of a determined risk of tilting about the longitudinal axis (84) of the motor vehicle, wherein the determined risk is determined by the electronic control unit and the braking is controlled by the electronic control unit;

starting an ABS control operation by the electronic control unit, wherein, with the start (t1) of the ABS control operation on a brake pressure ($p_{B\_KI}$) of the wheel brake (26b; 28b) on the inside of the bend on at least one motor vehicle axle (4; 8), increasing the brake pressure ($p_{B\_KA}$) of a wheel brake (26a; 28a) on the outside of the bend, and lowering the brake pressure ($p_{B\_KA}$) of the at least one wheel brake (26a; 28a) on the outside of the bend with an end of the ABS control operation (t3).

6. The method as claimed in claim 5, wherein the increase in the brake pressure ($\Delta p_{B\_KA}$) of the wheel brake (26a; 28a) on the outside of the bend compensates for a loss of braking force of the wheel brake (26b; 28b) on the inside of the bend due to the ABS control operation.

7. The method as claimed in claim 6, wherein a mean brake pressure ($p_{B\_R-m}$) of the wheel brake (26b; 28b) on the inside of the bend is determined during the ABS control operation, and the value of the increase in the brake pressure ($\Delta p_{B\_KA}$) of the wheel brake (26a; 28a) on the outside of the bend corresponds to a pressure difference ($\Delta p_{B\_KI}$) between a standard brake pressure ($p_{B\_KS\_Std}$) provided from the start of the execution of the roll stability control function and the mean brake pressure ($p_{B\_R-m}$) of the wheel brake (26b) on the inside of the bend ($\Delta p_{B\_KA} = \Delta p_{B\_KI} = p_{B\_KS\_Std} - p_{B\_R-m}$).

8. The method as claimed in claim 7, wherein, during the ABS control operation on the brake pressure ($p_{B\_KI}$) at the wheel brake (26b; 28b) on the inside of the bend, an upper brake pressure ($p_{B\_R-o}$) and a lower brake pressure ($p_{B\_R-u}$) are determined, and the mean brake pressure ($p_{B\_R-m}$) at the wheel brake (26b; 28b) on the inside of the bend is determined as an arithmetic mean value of the upper brake pressure ($p_{B\_R-o}$) and the lower brake pressure ($p_{B\_R-u}$) during the ABS control operation ($p_{B\_R-m} = (p_{B\_R-o} + p_{B\_R-u})/2$).

9. The method as claimed in claim 5, wherein the increase in the brake pressure ($p_{B\_KA}$) of the wheel brake (26a; 28a) on the outside of the bend is accomplished by setting a correspondingly increased brake pressure ($p_{B\_KA\_max}$) in a relay valve (70c; 54c) assigned to the relevant motor vehicle axle (4; 8).

10. The method as claimed in claim 5, wherein, at the end of the ABS control operation, the brake pressure ($p_{B\_KA}$) set in the relay valve (70c; 54c) of the motor vehicle axle (4; 8) is lowered again to the standard brake pressure ($p_{B\_KS\_Std}$) provided by the roll stability control function.

11. An electronic control unit (14) for a motor vehicle (2), which control unit carries out the method steps as claimed in claim 1.

12. An electronic control unit (14) for a motor vehicle (2), which control carries out the method steps as claimed in claim 5.

13. The method as claimed in claim 5, wherein the increase in the brake pressure on the wheel brake on the outside of the bend progresses at first rate for a first period of time and, following a determination of a loss of pressure on the wheel brake on the inside of the bend due to the ABS control operation, the increase in the brake pressure progresses at a greater rate relative to the first rate.

14. The method as claimed in claim 1, wherein the increase in the brake pressure on the wheel brake on the outside of the bend progresses at first rate for a first period of time and, following a determination of a loss of pressure on the wheel brake on the inside of the bend due to the ABS control operation, the increase in the brake pressure progresses at a second rate that is a greater rate relative to the first rate.

15. The method as claimed in claim 13, wherein the increase in brake pressure progresses at the second rate until the pressure reaches a level that exceeds a target pressure, determined by the RSC operation, by the same amount as an average loss of pressure, relative to the target pressure, due to the ABS control operation.

16. The method as claimed in claim 14, wherein the increase in brake pressure progresses at the second rate until the pressure reaches an upper level that exceeds a target pressure, determined by the RSC operation, by the same amount as an average loss of pressure, relative to the target pressure, due to the ABS control operation.

17. The method as claimed in claim 15, wherein the brake pressure on the wheel brake on the outside of the bend is held constant at the upper level until the ABS control operation ends, at which time the brake pressure on the wheel brake on the outside of the bend decreases to the target pressure and is then held at the target pressure.

18. The method as claimed in claim 16, wherein the brake pressure on the wheel brake on the outside of the bend is held constant at the upper level until the ABS control operation ends, at which time the brake pressure on the wheel brake on the outside of the bend decreases to the target pressure and the brake pressure on the wheel brake on the inside of the bend increases to the target pressure, each of which are then held at the target pressure.

19. The method as claimed in claim 17, wherein the brake pressure on the wheel brakes on both the inside of the bend and the outside of the bend remain at the target pressure until the RSC operation ends, at which time the brake pressure on the wheel brakes on both the inside and outside of the bend decreases to zero.

20. The method as claimed in claim 18, wherein the brake pressure on the wheel brakes on both the inside of the bend and the outside of the bend remain at the target pressure until the RSC operation ends, at which time the brake pressure on the wheel brakes on both the inside and outside of the bend decreases to zero.

\* \* \* \* \*